Aug. 29, 1961 L. BURNS 2,998,572
CRYSTAL AMPLIFIER
Original Filed July 20, 1948
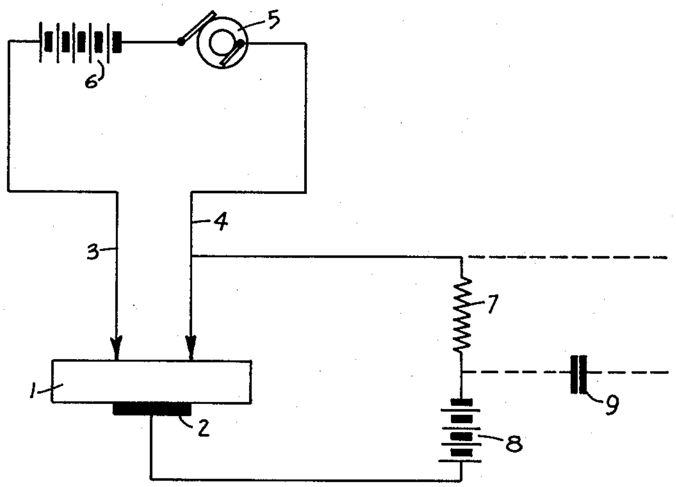
INVENTOR:
Laurence Burns

United States Patent Office 2,998,572

Patented Aug. 29, 1961

2,998,572

CRYSTAL AMPLIFIER

Laurence Burns, Swampscott, Mass., assignor, by mesne assignments, to Sylvania Electric Products Inc., Wilmington, Del., a corporation of Delaware Continuation of applications Ser. No. 298,574, July 12, 1952, and Ser. No. 39,664, July 20, 1948. This application Aug. 25, 1958, Ser. No. 757,003
5 Claims. (Cl. 330—32)

This invention relates to crystal and other semi-conductor amplifiers, oscillators, rectifiers and the like, and to circuits for their connection.

Such devices with a "front" contact and a "back" contact have previously been used for rectification and oscillation. By my invention, the addition of a third contact and its proper connection permits use of the device also for amplification. Use of a single "back" contact and two "front" contacts with the input connected across the two front contacts and the output between a front contact and a back contact gives the high input impedance helpful in cascade amplification. By "back" contact I mean a contact having a large area and soldered or otherwise intimately connected directly to the crystal, and by "front" contact I mean a contact of small area, preferably an extremely fine point, such as a cat whisker contact. Typical forms of such contacts are shown in the copending application Serial No. 492,163 filed June 27, 1943, and typical crystals are germanium containing a small amount, for example 0.1%, of an activating impurity such as tin, sometimes called an acceptor or donator impurity.

Other objects, features and advantages of the invention will be apparent from the following specification and accompanying drawings in which:

The figure is a schematic drawing of an amplifier according to the invention.

In the figure, the crystal 1, has the back contact 2 and the two cat whisker contacts 3, 4. The input signal to be amplified is placed across the two cat whiskers 3, 4 and is represented by the generator 5. A biasing battery 6 or other source of direct current is placed in series with the signal source 5.

The output is taken between cat whisker 4 and back contact 2, the output being represented by an impedance 7, for example a resistance. A battery 8 or other source of direct current provides the bias voltage between these electrodes.

The cat whisker 4 may, for example, be biased negatively with respect to the back electrode 2, and a sufficient voltage supply 6 in the opposite direction used to insure that cat whisker 3 is biased positively with respect to electrode 2, if desired. For some purposes, for example to lower the output resistance, cat whisker 4 may be made positive with respect to electrode 2, and then cat whisker 3 may be made more positive, if desired, or more negative, depending on the input resistance desired. The fact that the input is connected between the two cat whiskers insures that the input impedance is always high, for the input is always applied in effect, across two rectifiers connected back-to-back.

The bias voltage of supply 6 may be made zero for some cases, in order to keep both cat whiskers at the same potential with respect to electrode 2, which may in some cases give greater linearity of response.

In cascade amplifiers the output across impedance 7 may be connected through condenser 9 to the two cat whiskers of the next stage, the condenser 9 being connected preferably to the corresponding cat whisker 3 of the next stage so that the bias to common connection at cat whisker 4 will not be affected.

The contacts 3 and 4 may be placed quite close to each other, for example as close to 0.001 inch or less.

With the input signal connected directly across the two cat whiskers as shown, however, the spacing may generally be greater, when desired, than where the input is connected between one cat whisker and the back contact. The biasing voltage suppliers 6 and 8 are shown connected in series; they may, however, be connected in shunt with their respective input voltage and output impedance, if desired, a proper choke coil or impedance being then placed in series with the suppliers 6 and 8 to keep the varying voltages from being short-circuited. The battery 6 may be connected between cat whisker 3 and back contact 2 if desired, with a choke used in series with it, leaving only the signal voltage connected directly between cat whiskers 3 and 4.

Feedback may be arranged between the input and output circuits if desired for oscillation or regenerative amplification.

Cat whiskers 3 and 4 are each seen to be rectifying connections, or terminals having a rectifying transition to body 1, unlike the large-area contact 2 that is soldered or otherwise intimately connected to the semiconductor body 1. The input rectifying connection to body 1 in such semi-conductor devices is termed an "emitter," and the output rectifying connection is termed a "collector."

In the preferred form the rectifying connections 3 and 4, or emitter and collector, are biased oppositely as previously indicated.

This application is a continuation of my application Serial No. 39,664, filed July 20, 1948, now abandoned and also of my application Serial No. 298,574, filed July 12, 1952.

What I claim is:

1. A semi-conductor amplifier comprising a semi-conductive crystal, a contact of large area on said crystal, first and second point-contacts engaging said crystal, said point-contacts being mutually separated by a distance of approximately .001 inch, an input signal source connected in a circuit between said point-contacts, and an output impedance external to said circuit and connected between the large-area contact and one of the point-contacts.

2. A signal translating circuit, including a semi-conductor translating device embodying a semiconductor body having an emitter, a collector and a back connection, and a load impedance, a signal source connected in a series circuit between said back connection and said emitter, said collector being connected to a point in said series circuit between said load impedance and said signal source, said signal source being connected between said emitter and said collector, and said load being connected between said back contact and said collector.

3. A signal translating circuit, including a translating device comprising a semiconductor body having a pair of connections providing closely adjacent rectifying transitions to said body, said connections being polarized to present series-opposed rectifying barriers to potentials that may be applied thereto, said translating device having a further intimate connection to said body, said translating circuit embodying biasing potential supply means causing said pair of rectifying transitions to be biased oppositely with respect to said further connection, said translating circuit additionally including a series circuit having a load impedance and a signal source connected between said further connection and one of said pair of connections, the other of said pair of connections being connected to a point in said series circuit between said load impedance and said signal source, said signal source being connected between said pair of connections, and said load impedance being connected between said further connection and said other of said pair of connections.

4. A semi-conductor crystal circuit comprising a signal source, an N-type semi-conducting body, three connections thereto, two of said connections being of the rectifying type and being effectively connected back-to-back in series with said signal source, one of said electrodes being biased negatively and the other positively with respect to the third connection, and an output impedance connected in series with said negatively-biased electrode and said third connection, the positively biased electrode being connected to a point in the circuit between the negatively-biased electrode and said third connection.

5. A semi-conductor crystal circuit comprising a signal source, a tin-doped germanium semi-conductor body, two point contacts thereto and a back connection thereto, the two point connections being connected back-to-back in series with said signal source, one of said point contacts being biased negatively and the other positively with respect to said back connection, the negatively-biased contact being connected to a point in the circuit between the positively-biased contact and the back contact.

References Cited in the file of this patent

UNITED STATES PATENTS

| | | |
|---|---|---|
| 2,504,627 | Benzer | Apr. 18, 1950 |
| 2,569,347 | Shockley | Sept. 25, 1951 |
| 2,600,997 | Lark-Horowitz | June 17, 1952 |
| 2,662,124 | McMillan | Dec. 8, 1953 |

OTHER REFERENCES

Wells: "Experimental Germanium Crystal Amplifier," Audio Engineering, July 1948, pages 6 and 8.